(12) United States Patent
Henderkott

(10) Patent No.: US 10,162,331 B2
(45) Date of Patent: Dec. 25, 2018

(54) REMOVAL OF MATERIAL FROM A SURFACE OF A DUAL WALLED COMPONENT

(71) Applicant: Rolls-Royce Corporation, Indianapolis, IN (US)

(72) Inventor: Joseph Peter Henderkott, Westfield, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 338 days.

(21) Appl. No.: 15/045,166

(22) Filed: Feb. 16, 2016

(65) Prior Publication Data

US 2016/0259322 A1 Sep. 8, 2016

Related U.S. Application Data

(60) Provisional application No. 62/126,987, filed on Mar. 2, 2015.

(51) Int. Cl.
G05B 19/404 (2006.01)

(52) U.S. Cl.
CPC .. G05B 19/404 (2013.01); *G05B 2219/37206* (2013.01); *G05B 2219/45147* (2013.01); *G05B 2219/49223* (2013.01)

(58) Field of Classification Search
CPC .................................................. G05B 19/404
USPC ........................................................ 700/98
See application file for complete search history.

(56) References Cited

U.S. PATENT DOCUMENTS

| 3,540,315 | A | * | 11/1970 | Freitag | .................. | B26D 3/006 |
|---|---|---|---|---|---|---|
| | | | | | | 219/69.17 |
| 4,509,126 | A | | 4/1985 | Olig et al. | | |
| 4,937,768 | A | | 6/1990 | Carver et al. | | |
| 4,945,488 | A | | 7/1990 | Carver et al. | | |
| 4,956,764 | A | | 9/1990 | Carver et al. | | |

(Continued)

FOREIGN PATENT DOCUMENTS

| EP | 2070641 A2 | 6/2009 |
|---|---|---|
| GB | 2350809 A | 12/2000 |

OTHER PUBLICATIONS

Mori et al., "A study on energy efficiency improvement for machine tools", CIRP Annals—Manufacturing Technology, vol. 60, Jan. 2011, pp. 145-148.

(Continued)

*Primary Examiner* — Jami V Miller
(74) *Attorney, Agent, or Firm* — Shumaker & Sieffert, P.A.

(57) ABSTRACT

A system may include at least one sensor, at least one machining device, and a computing device. The computing device may be operable to control the at least one sensor to inspect at least a portion of a coversheet of a dual walled component to generate dimensional surface data for the at least a portion of the coversheet and compare the dimensional surface data to surface model data. The comparison may indicate portions of the coversheet that include additional material. The computing device also may be operable to generate a compromise surface model based on the comparison between the dimensional surface data and the surface model data and control the at least one machining device to machine the dual walled component based on the compromise surface model to remove the additional material.

15 Claims, 4 Drawing Sheets

(56) References Cited

U.S. PATENT DOCUMENTS

| | | | |
|---|---|---|---|
| 5,023,800 A | 6/1991 | Carver et al. | |
| 5,285,572 A | 2/1994 | Rathi et al. | |
| 5,288,199 A | 2/1994 | Enomoto | |
| 5,388,199 A | 2/1995 | Kakazu et al. | |
| 6,701,615 B2 | 3/2004 | Harding et al. | |
| 6,745,101 B2 | 6/2004 | Andersen et al. | |
| 6,832,128 B2 | 12/2004 | Haupt | |
| 6,912,446 B2 | 6/2005 | Wang et al. | |
| 6,969,821 B2 | 11/2005 | Mika et al. | |
| 7,415,400 B2 * | 8/2008 | Zhu | G05B 19/404 700/98 |
| 7,472,478 B2 | 1/2009 | Graham et al. | |
| 7,797,828 B2 | 9/2010 | Beeson et al. | |
| 8,712,577 B2 | 4/2014 | Gu et al. | |
| 8,844,132 B2 | 9/2014 | Blais et al. | |
| 8,904,636 B2 | 12/2014 | Blais et al. | |
| 9,269,189 B1 | 2/2016 | Marinov et al. | |
| 9,817,389 B2 * | 11/2017 | Rhodes | G05B 19/4099 |
| 2003/0004606 A1 | 1/2003 | Duffin | |
| 2003/0200005 A1 | 10/2003 | Hirai et al. | |
| 2006/0253270 A1 | 11/2006 | Nguyen | |
| 2007/0012858 A1 | 1/2007 | Callis | |
| 2007/0163684 A1 * | 7/2007 | Hu | C22C 1/0433 148/528 |
| 2008/0269944 A1 | 10/2008 | Hoffmann et al. | |
| 2009/0038139 A1 * | 2/2009 | Kerschner | B23K 26/03 29/566 |
| 2009/0144980 A1 | 6/2009 | Rangarajan et al. | |
| 2009/0157215 A1 * | 6/2009 | Stahlhut | B44C 1/22 700/118 |
| 2009/0319077 A1 | 12/2009 | Cameron | |
| 2010/0030366 A1 | 2/2010 | Scherer | |
| 2010/0034029 A1 | 2/2010 | Xiong et al. | |
| 2010/0095526 A1 | 4/2010 | Derrien et al. | |
| 2010/0121478 A1 | 5/2010 | Jahn et al. | |
| 2010/0161107 A1 | 6/2010 | Kappmeyer et al. | |
| 2012/0154570 A1 | 6/2012 | Bunker et al. | |
| 2014/0228996 A1 | 8/2014 | Owens | |
| 2014/0257543 A1 | 9/2014 | Rhodes et al. | |
| 2014/0257551 A1 | 9/2014 | Junod et al. | |
| 2014/0316552 A1 * | 10/2014 | Shindo | B23P 23/04 700/179 |
| 2015/0099422 A1 * | 4/2015 | Deleris | B29C 73/26 451/2 |
| 2016/0250725 A1 * | 9/2016 | Henderkott | F23R 3/002 60/752 |

OTHER PUBLICATIONS

Pham et al., "Micro-EDM—recent developments and research issues", Journal of Materials Processing Technology, vol. 149, Jun. 10, 2004, pp. 50-57.

* cited by examiner

REMOVAL OF MATERIAL FROM A SURFACE OF A DUAL WALLED COMPONENT

This application claims the benefit of U.S. Provisional Application No. 62/126,987 filed Mar. 2, 2015, which is incorporated herein by reference in its entirety

TECHNICAL FIELD

The disclosure relates to techniques for detecting and removing material from a surface of a dual walled component.

BACKGROUND

Dual walled components may be used in high temperature mechanical systems, such as gas turbine engines. A dual walled component may include a spar, which provides structural support and is the main load bearing element of the dual walled component. The spar may include a plurality of pedestals to which a coversheet or outer wall is attached. The coversheet defines the outer surface of the dual walled component, and may function as a heat shield. Cooling fluid, such as air, may be passed through the volume between the spar and the back side of the coversheet to aid in cooling the coversheet. Due to this back side cooling, dual walled components may allow use of higher operating temperatures than single walled components.

SUMMARY

In some examples, the disclosure described a method that includes controlling, by a computing device, at least one sensor to inspect at least a portion of a coversheet of a dual walled component to generate dimensional surface data for the at least a portion of the coversheet. The method also may include comparing, by the computing device, the dimensional surface data to surface model data, where the comparison indicates portions of the coversheet that include additional material. In some examples, the method also includes generating, by the computing device, a compromise surface model based on the comparison between the dimensional surface data and the surface model data; and controlling, by the computing device, at least one machining device to machine the dual walled component based on the compromise surface model to remove the additional material.

In some examples, the disclosure describes a system that includes at least one sensor, at least one machining device, and a computing device. The computing device may be operable to control the at least one sensor to inspect at least a portion of a coversheet of a dual walled component to generate dimensional surface data for the at least a portion of the coversheet. The computing device also may be operable to compare the dimensional surface data to surface model data, where the comparison indicates portions of the coversheet that include additional material; and generate a compromise surface model based on the comparison between the dimensional surface data and the surface model data. In some example the computing device is further operable to control the at least one machining device to machine the dual walled component based on the compromise surface model to remove the additional material.

In some examples, the disclosure describes a computer readable storage medium including instructions that, when executed, cause at least one processor to control at least one sensor to inspect at least a portion of a coversheet of a dual walled component to generate dimensional surface data for the at least a portion of the coversheet. The computer readable storage medium also may include instructions that, when executed, cause the at least one processor to compare the dimensional surface data to surface model data, where the comparison indicates portions of the coversheet that include additional material; and generate a compromise surface model based on the comparison between the dimensional surface data and the surface model data. Additionally, the computer readable storage medium may include instructions that, when executed, cause the at least one processor to control at least one machining device to machine the dual walled component based on the compromise surface model to remove the additional material.

The details of one or more examples are set forth in the accompanying drawings and the description below. Other features, objects, and advantages will be apparent from the description and drawings, and from the claims.

DETAILED DESCRIPTION

Figure 1:
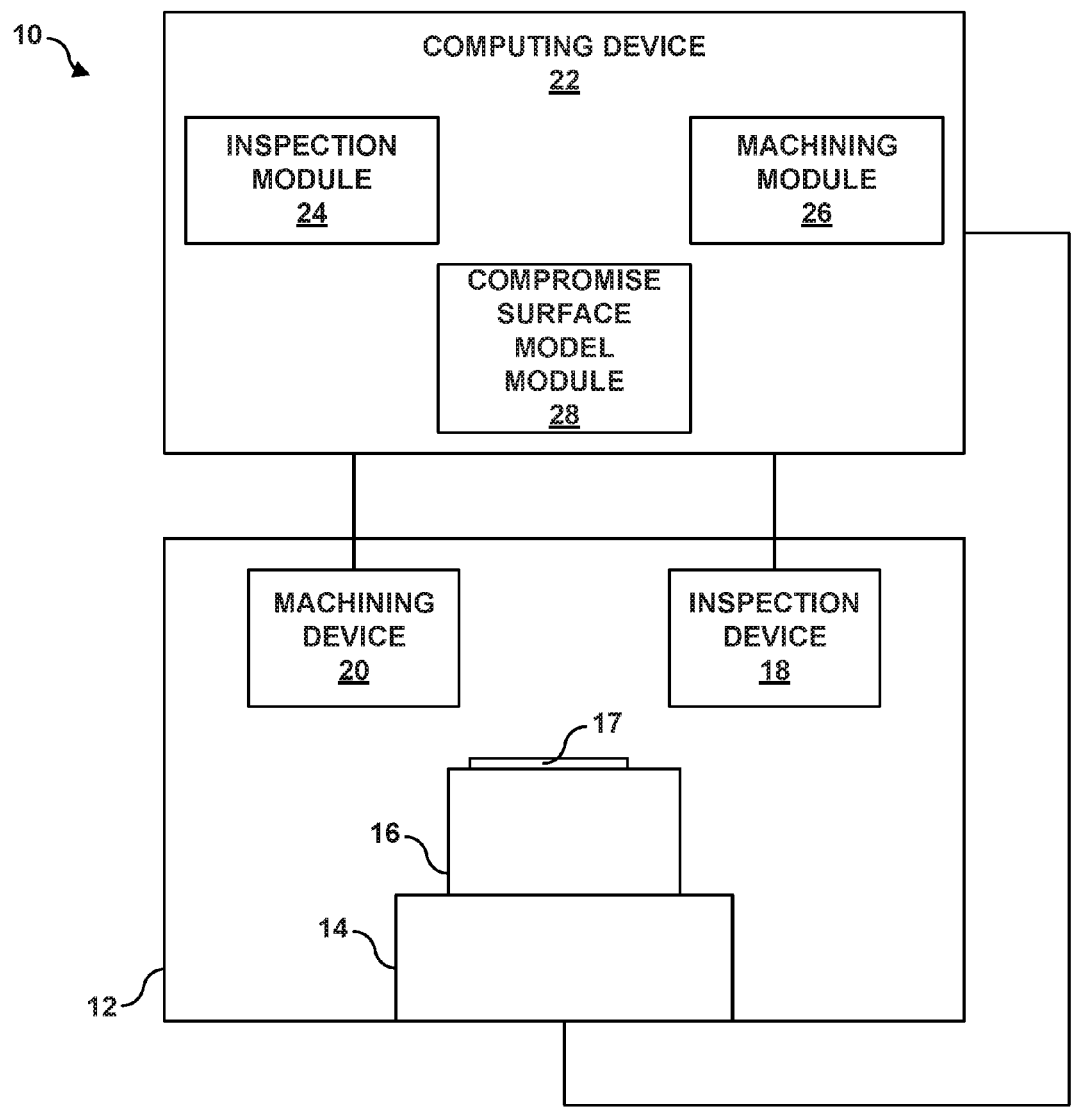
FIG. 1 is a conceptual and schematic diagram illustrating an example system for determining a presence of additional material on a surface of a dual walled component and machining the dual walled component to remove the additional material.

The disclosure describes systems and techniques for determining a presence of additional material on a surface of a dual walled component and machining the dual walled component to remove the additional material. As described above, a dual walled component includes a spar and a coversheet or outer wall. The spar may include a plurality of pedestals to which the coversheet is attached.

The coversheet may be joined to the spar (e.g., the plurality of pedestals) using, for example, a diffusion bonding technique or a brazing technique. During the joining technique, a fixture may be used to exert pressure between the coversheet and the spar. A compliant layer may be positioned between the coversheet and the fixture to distribute loads from the fixture over the surface of the coversheet to reduce point loading and facilitate joining of the coversheet to each of the plurality of pedestals. For example, the compliant layer may be configured to deform prior to deformation of the coversheet, which may serve to distribute loads from the fixture over the surface of the coversheet.

In some examples, due to the high forces exerted on the compliant layer by the fixture, portions of the compliant layer may be joined to the external surface of the coversheet. These portions of the compliant layer should be removed from the coversheet, as some may at least partially occlude film cooling holes in the coversheet. If not removed, this may reduce the effectiveness of the film cooling holes. Other portions of the compliant layer may result in the surface of the coversheet deviating from the intended surface geometry. Further, the compliant layer may have a different alloy composition than the coversheet, which may possess different properties (e.g., chemical reactivity, high temperature mechanical properties, adherence to coatings, etc.), and may negatively impact performance of the dual walled component because of the different properties.

In accordance with one or more examples of this disclosure, a computing device may control at least one sensor to acquire dimensional surface data of at least a portion of the surface of the coversheet. The computing device may compare the dimensional surface data to model surface data, which may represent a nominal geometry of the coversheet. At least some deviations of the dimensional surface data from the model surface data may be due to additional material being present on the coversheet, and at least some of this additional material may be material from the compliant layer. Based at least in part on differences between the dimensional surface data the model surface data, the computing device may determine a compromise surface model. The compromise surface model may represent a surface that is a compromise between the as-manufactured coversheet and the model coversheet, and may substantially exclude the additional material. The computing device then may control at least one machining device to machine at least a portion of the coversheet to remove the additional material. The machining device may use a combination of, for example, grinding, polishing, drilling, or the like to remove the additional material. The machining may remove additional material from at least one of the external surface of the coversheet, at least one film cooling hole, or the like.

In this way, an automated technique may identify additional material on the coversheet and control a machining device to remove the additional material from coversheet. Further, because the machining is based on a compromise surface model, the machining may adapt to the as-manufactured geometry of the dual walled component, rather than being based only on model data.

FIG. 1 is a conceptual and schematic diagram illustrating an example system 10 for determining a presence of additional material 17 on a surface of a dual walled component 16 and machining the dual walled component 16 to remove the additional material 17. System 10 may include an enclosure 12, which encloses a stage 14, an inspection device 18, a machining device 20, and dual walled component 16. System 10 also may include a computing device 22, which may include an inspection module 24, a machining module 26, and a compromise surface model module 28.

Figure 2:
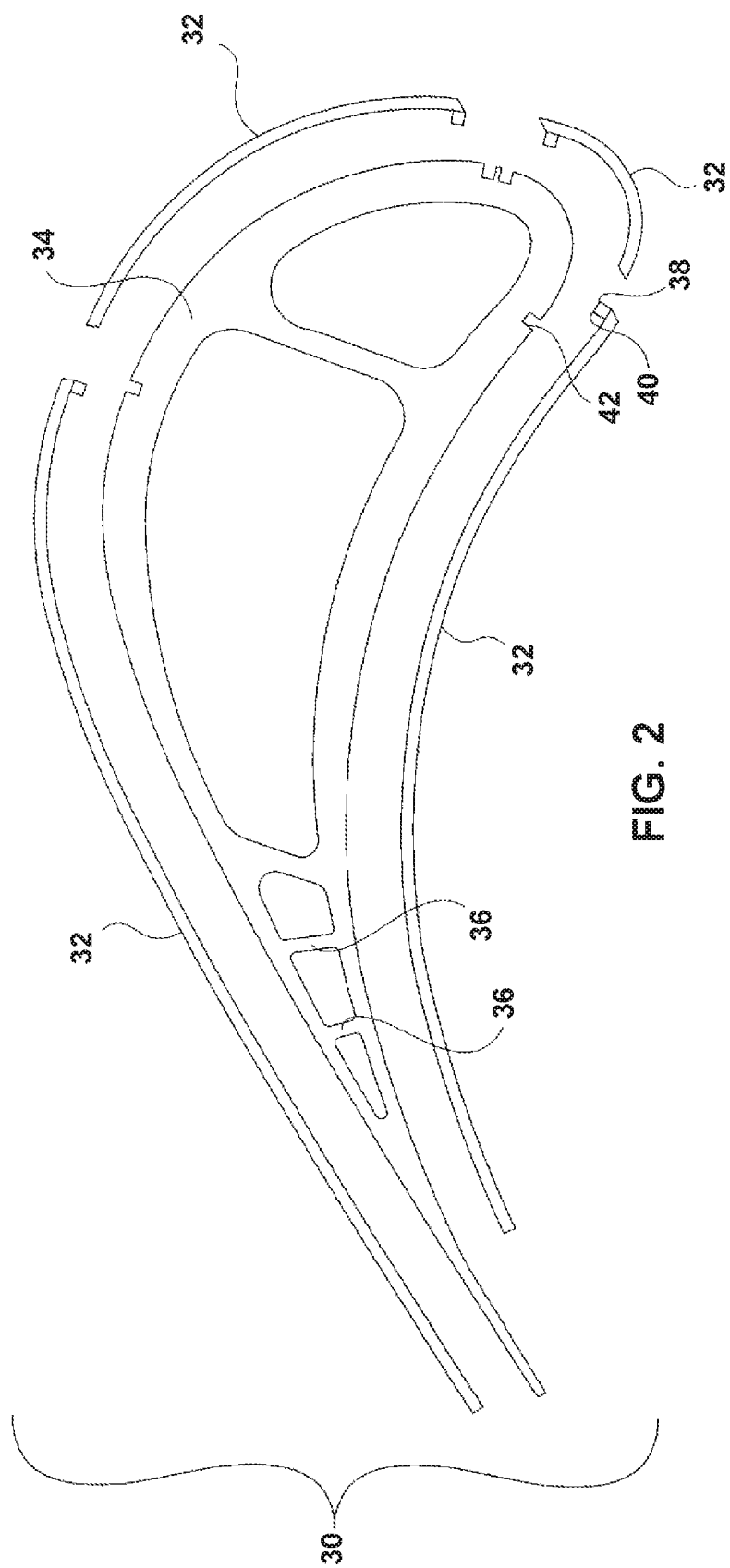
FIG. 2 is an exploded sectional view of an example dual walled component including a coversheet and a spar.

In some examples, dual walled component 16 may include a component of a gas turbine engine. For example, dual walled component 16 may include a part that forms a portion of a flow path structure or another portion of the gas turbine engine. Dual walled component 16 includes a plurality of parts (e.g., at least two), which are joined using e.g., brazing or diffusion bonding. FIG. 2 is an exploded sectional view of an example dual walled component 16 including a coversheet 32 and a spar 34, which may include additional material that may be removed using the system shown in FIG. 1. Coversheet 32 and spar 34 may be joined using brazing or diffusion bonding. In the example of FIG. 2, dual walled component 16 is an airfoil 30 for a gas turbine engine. In other examples, dual walled component 16 may be a combustor liner or the like. Each of coversheet 32 and spar 34 are preformed, and may be cast or wrought. In the example of FIG. 2, coversheet 32 includes a plurality of members (e.g., four members). In other examples, coversheet 32 may include more or fewer members.

Coversheet 32 is shaped to substantially correspond to an outer surface of spar 34. In some examples, coversheet 32 and spar 34 may be formed of similar materials, such as similar alloys. In other examples, coversheet 32 and spar 34 may be formed of different materials, selected to provide different properties. For example, spar 34 may be formed of a material selected to provide strength to airfoil 30, while coversheet 32 is formed of a material selected to provide resistance to oxidation or a relatively low coefficient of thermal expansion. In some examples, the alloys from which coversheet 32 and spar 34 are formed may include a Ni-based alloy, a Co-based alloy, a Ti-based alloy, or the like.

Spar 34 may also include a plurality of pedestals on an outer surface of the walls of spar 34, to which coversheet 32 are joined. The plurality of pedestals may help define channels between spar 34 and coversheet 32 through which cooling fluid (e.g., air) may flow. In some examples, coversheet 32 and spar 34 include one or more locating features 38 including protrusion 40 of coversheet 32 and complementary depression 42 of spar 34. The locating features 38 may assist with positioning coversheet 32 relative to spar 34.

The portions of coversheet 32 may be joined to spar 34 (e.g., the plurality of pedestals) using a diffusion bonding technique or a brazing technique. During the diffusion bonding technique or the brazing technique, a fixture may be used to exert pressure between the respective portion of coversheet 32 and spar 34. A compliant layer may be positioned between the respective portions of coversheet 32 and fixture 34 to distribute loads from the fixture over the surface of coversheet 32 to reduce point loading and facilitate joining of the portions of coversheet 32 to each of the plurality of pedestals of spar 34. For example, the compliant layer may be formed of a material (e.g., metal, such as stainless steel) and with a mechanical configuration (e.g., a mesh) that causes the compliant layer to deform prior to coversheet 32. As described above, in some examples, at least part of the compliant layer may be joined to the surface of coversheet 32 as additional material due to the high forces applied to the compliant layer during the joining technique. Returning to FIG. 1, additional material 17 is illustrated attached to dual walled component 16.

Returning to FIG. 1, enclosure 12 may substantially enclose (e.g., enclose or nearly enclose) stage 14, dual walled component 16, inspection device 18, and machining device 20.

In some examples, stage 14 may be configured to selectively position and restrain dual walled component 28 in place relative to stage 14 during formation or repair of component 28. In some examples, stage 14 is movable relative to inspection device 18 and/or machining device 20. For example, stage 14 may be translatable and/or rotatable along at least one axis to position dual walled component 16 relative to inspection device 18 and/or machining device 20. Similarly, in some examples, at least one of inspection device 18 and/or machining device 20 may be movable relative to stage 14 to position the at least one of inspection device 18 and/or machining device 20 relative to dual walled component 16.

Inspection device 18 may include any suitable device capable of measuring dimensional surface data of dual walled component 16. In some examples, inspection device 18 may be a non-contact device, i.e., a device that measures dimensional surface data of dual walled component 16 without contacting dual walled component 16 or additional material 17. For example, inspection device 18 may utilize white or blue light to inspect dual walled component 16 and measure dimensional surface data.

In some examples, inspection device 18 may include, for example, a coordinate measuring machine (CMM) that determines coordinates of points at multiple locations of the coversheet surface. Inspection device 18 may additionally and/or alternatively measure geometric characteristics other than and/or related to the dimensional surface data of the dual walled component 16. In some examples, inspection device 18 may measure and obtain data points in six degrees of freedom, for example, translation and rotation of inspection device 18 and/or stage 14 with respect to three different perpendicular axes. The measured dimensional surface data can include any number, or set or multiple sets, of point coordinates that inspection device 18 determines to be on the surface of dual walled component 18 at different locations. As will be appreciated, the greater the number of points, which can be in the hundreds to millions or more, in a set or multiple sets, the more robust the measured dimensional surface data will be in establishing the shape (and location) of the dual walled component 16.

Machining device 20 may include, for example, a milling machine or grinder, which may be used to perform machining operations including drilling, grinding, polishing, or the like.

Computing device 22 may include, for example, a desktop computer, a laptop computer, a workstation, a server, a mainframe, a cloud computing system, or the like. Computing device 22 may include or may be one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some examples, the functionality of computing device 22 may be provided within dedicated hardware and/or software modules.

Computing device 22 is configured to control operation of system 10, including, for example, stage 14, inspection device 18, and/or machining device 20. Computing device 22 may be communicatively coupled to at least one of stage 14, inspection device 18, and/or machining device 20 using respective communication connections. Such connections may be wireless and/or wired connections.

Computing device 22 may be configured to control operation of stage 14, inspection device 18, and/or machining device 20 to position dual walled component 16 relative to stage 14, inspection device 18, and/or machining device 20. For example, as described above, computing device 22 may control stage 14, inspection device 18, and/or machining device 20 to translate and/or rotate along at least one axis to position dual walled component 16 relative to stage 14, inspection device 18, and/or machining device 20.

As shown in FIG. 1, computing device 22 may include an inspection module 24, a machining module 26, and a compromise surface model module 28. Modules 24, 26, and 28 may perform operations described using software, hardware, firmware, or a mixture of hardware, software, and firmware residing in and/or executing at computing device 22. Computing device 22 may execute respective modules 24, 26, and 28 with one or more processors. In some examples, modules 24, 26, and 28 may execute as one or more services or components of operating systems or computing platforms of computing device 22, or as one or more executable programs at application layers of computing platforms of computing device 22.

Inspection module 24 is operable to control inspection device 18 to inspect dual walled component 16 and generate dimensional surface data representative of a surface geometry of at least part of dual walled component 16. For example, inspection module 24 may control at least one of positioning of inspection device 18 relative to stage 14 (and, thus, dual walled component 16), initiation of inspection of dual walled component 16 by inspection device 18, cessation of inspection of dual walled component 16 by inspection device 18, resolution of dimensional surface data (e.g., the number of data points in the dimensional surface data or the number of data points per unit area of dual walled component 16 in the dimensional surface data), or the like. Inspection module 24 also may receive the dimensional surface data from inspection device 18, or may generate the dimensional surface data based on signals received from inspection device 18.

Machining module 26 may be operable to control machining device 20 to machining at least one selected portion of dual walled component 16 to remove additional material 17 based on a compromise surface data model generated by compromise surface model module 28. In some examples, machining module 26 may include machine tool program instructions, for example in G-code language, for controlling a machine tool path of machining device 20. The machine tool program instructions may include any suitable control instructions for machining device 20, for example, instructions for feed rate, spindle speed, axes motion, among others.

Compromise surface model module 28 may be operable to determine a compromise surface model based on surface model data and the dimensional surface data measured by inspection device 18. The surface model data may be representative of a model (e.g., nominal or design) surface of dual walled component 18, and may be based on a representative manufactured part, a CAD drawing of a nominal dual walled component, or the like. The function of compromise surface model module 28 will be described in further detail with reference to the technique illustrated in FIG. 3.

Figure 3:
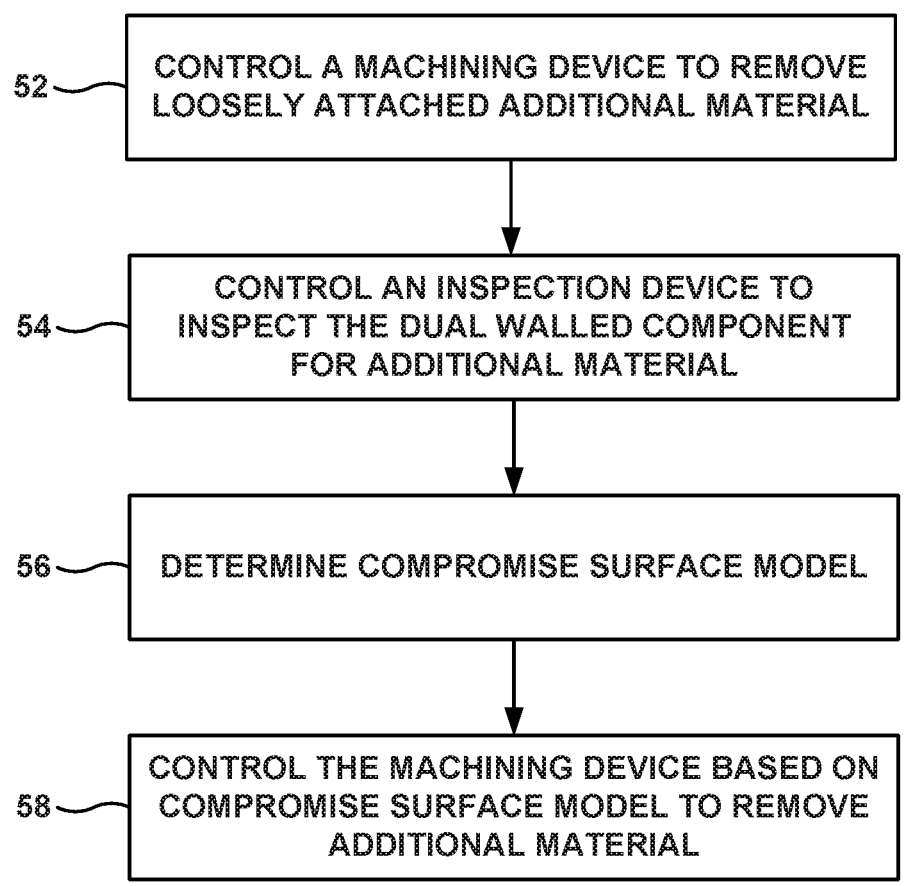
FIG. 3 is a flow diagram illustrating an example technique for determining a presence of additional material on a surface of a dual walled component and machining the dual walled component to remove the additional material.

FIG. 3 is a flow diagram illustrating and example technique for determining a presence of additional material on a surface of a dual walled component and machining the dual walled component to remove the additional material. The technique of FIG. 1 will be described with respect to system 10 of FIG. 1 and dual walled component 62 of FIG. 4 for ease illustration only. However, it will be understood that the technique of FIG. 3 may be performed by a different system, performed on a different dual walled component, or both. Further it will be understood that system 10 may perform another technique for determining a presence of additional material on a surface of a dual walled component and machining the dual walled component to remove the additional material.

Figure 4:
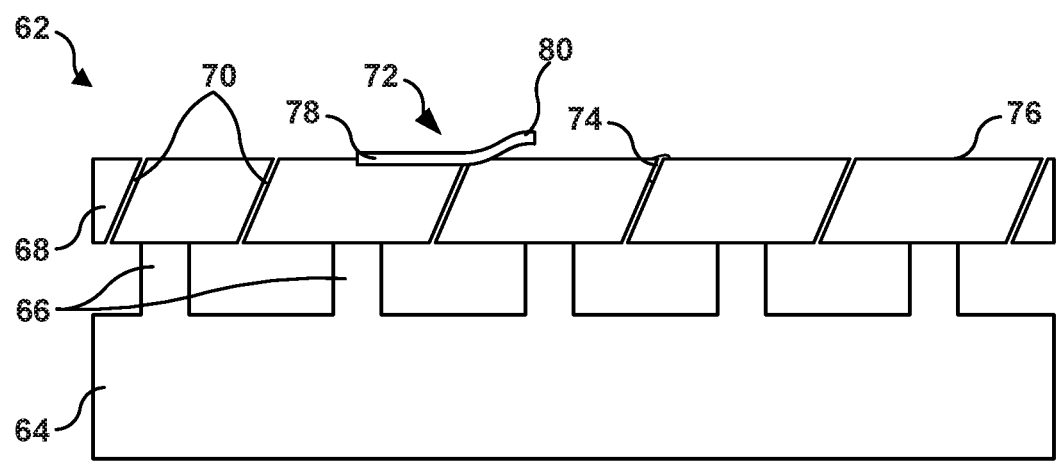
FIG. 4 is a conceptual and schematic diagram illustrating an example dual walled component including additional material on a surface of a coversheet, and in a film cooling hole.

FIG. 4 is a conceptual and schematic diagram illustrating an example dual walled component 62 that includes additional material on a surface of a coversheet 68. As shown in FIG. 4, dual walled component 62 includes a spar 64, which defines an inner wall of dual walled component 62 and includes a plurality of pedestals 66. Coversheet 68 or outer wall is attached to plurality of pedestals 66.

Coversheet 68 also may include a plurality of film cooling holes 72. Each of plurality of film cooling holes 72 may extend from an outer surface to an inner surface of coversheet 68. Each of plurality of film cooling holes 72 fluidically connects to a cavity defined by coversheet 68 and spar

64. Cooling fluid, such as air, may flow through the cavity and exit through film cooling holes 72 to help cool coversheet 68.

First additional material 72 and second additional material 74 are attached to coversheet 68. In some examples, first additional material 72 and second additional material 74 may be material from a compliant layer used during the process of joining coversheet 68 and spar 64. For example, first additional material 72 and second additional material 74 may be remnants of the compliant layer that became embedded in or joined to coversheet 68 due to the pressure exerted on coversheet 68 by the compliant layer.

In some examples, first additional material 72 may be attached to an outer surface 76 of coversheet 68. First additional material 72 may include a tightly attached additional material 78 and a loosely attached additional material 80. First additional material 72 may occlude a film cooling hole of film cooling holes 70.

Second additional material 74 may be disposed at least partially in a film cooling hole of film cooling holes 70 and may at least partially occlude the film cooling hole of film cooling holes 70.

In some examples, the technique of FIG. 3 optionally includes controlling, by machining module 26 of computing device 22, machining device 20 to remove loosely attached additional material 80 (52). In some examples, loosely attached additional material 80 may be removed by a machining operation that does not contact outer surface 76, such as passing a milling tool above outer surface 76 without contacting outer surface 76. Hence, machining module 26 may control machining device 20 to remove loosely attached additional material 80 (52) without precise knowledge of the geometry of outer surface 76.

In some examples, instead of machining module 26 controlling machining device 20 to remove loosely attached additional material 80, the technique of FIG. 3 may optionally include removing loosely attached additional material 80 by a technician, e.g., manually with a tool. For example, loosely attached additional material 80 may be removed by a technician using a pliers, abrasive paper, or other tool.

The technique of FIG. 3 also includes controlling, by inspection module 24, inspection device 18 to inspect dual walled component 62 for additional material on outer surface 76 of coversheet 68, in film cooling holes 70, or both (54). For example, inspection module 24 may control inspection device 18 to utilize a non-contact inspection technique to obtain dimensional surface data of outer surface 76 of coversheet 68, including film cooling holes 66 and any additional material present (e.g., first additional material 72 and second additional material 74). In some examples, inspection device 18 may include a coordinate measuring machine (CMM) that determines coordinates of points at multiple locations of coversheet 68, including film cooling holes 66 and any additional material present (e.g., first additional material 72 and second additional material 74).

The measured dimensional surface data can include any number, or set or multiple sets, of point coordinates that inspection device 18 indicates are on the surface of coversheet 68, including film cooling holes 66 and any additional material present (e.g., first additional material 72 and second additional material 74). As will be appreciated, the greater the number of points, which can be in the hundreds to millions or more, in a set or multiple sets, the more robust the measured dimensional surface data will be in establishing the shape (and location) of coversheet 68, including film cooling holes 66 and any additional material present (e.g., first additional material 72 and second additional material 74). Inspection module 24 may receive the dimensional surface data from inspection device 18, or may receive signals indicative of the dimensional surface data from inspection device 18 and generate the dimensional surface data from the signals received from inspection device 18.

Compromise surface model module 28 may receive the dimensional surface data from inspection module 24. The technique of FIG. 3 then includes determining, by compromise surface model module 28, a compromise surface model based on the dimensional surface data and surface model data (56). Compromise surface model module 28 may determine the compromise surface model by comparing the measured dimensional surface data to surface model data of dual walled component 62. The surface model data can include any suitable mathematical model, for example, in the form of one or more curves or surfaces, including splines or non-uniform rational basis splines (NURBS), for example, that represent (model) the airfoil spar surface. In some examples, the surface model data can include a design intent surface of dual walled component 62, defined by, for example, CAD spline knots. In some examples, the design intent surface can represent the ideal surface of dual walled component 62, that is the "perfect world" representation of the component surface, before, for example, the consideration of tolerances.

In some examples, when determining the compromise surface model, compromise surface model module 28 may compare a set of the measured dimensional surface data to a location of the design intent surface that is interpolated from the CAD spline knots. In some examples, inspection device 18, inspection module 24, or both may determine the coordinates of the points in a set relative to the coordinate system of inspection device 18, and compromise surface model module 28 may determine the coordinates of the same points relative to the coordinate system in which dual walled component 62 was designed, such as the design intent surface of dual walled component 62.

In some examples, compromise surface model module 28 may be configured to determine presence of additional material 72 and 74 based on discrepancies in the shape of dual walled component 62 as indicated by the measured dimensional surface data and the nominal shape of a dual walled component as indicated by the surface model data. For example, compromise surface model module 28 may be configured to differentiate between an undulation or curve of coversheet 68 an abrupt deviation caused by additional material 72 and 74.

In some examples, compromise surface model module 28 may be configured to utilize pattern recognition, contrast detection, or both in identifying additional material 72 and 74. For example, additional material 72 may have a different surface finish, a different color, or the like that coversheet 68, which may be reflected in the measured dimensional surface data. Compromise surface model module 28 may utilize the difference in surface finish, color, or the like to identify additional material 72 and 74.

Additionally or alternatively, in some examples, additional material 72 and 74 may be from a compliant layer. In some examples, the compliant layer may have a patterned geometry, such as a mesh. Compromise surface model module 28 may be configured to utilize pattern detection in identifying additional material 72 and 74, e.g., by identifying a geometric pattern corresponding to a geometric patter of the compliant layer.

In some examples, compromise surface model module 28 may modify the surface model data to arrive at the compromise surface model by performing a six degree of freedom (DOF) best-fit of the surface model data to the measured dimensional surface data. In some examples, compromise surface model module 28 may best-fit the surface model data to the measured dimensional surface data to account for possible misalignment caused by, for example, uncertainty in the orientation of dual walled component 62 during measurement of the dimensional surface data by inspection device 18. Alternatively, compromise surface model module 28 may best-fit the measured dimensional surface data to the surface model data to arrive at the compromise surface model.

In some examples, compromise surface model module 28 may determine the compromise surface model by modifying the design intent surface defined by the CAD spline knots. For example, compromise surface model module 28 may rotate and translate the design intent surface definition, or a subset of the design intent surface definition, to best-fit the measured dimensional surface data, or a subset of the measured dimensional surface data. In some examples, the rotation and translation can compensate for misalignment of dual walled component 62 relative to inspection device 18 during the inspection process. In some examples, compromise surface model module 28 may be configured to determine what rigid body translations and rotations can make the dimensional surface data measured from dual walled component 62 appear closest to, or substantially closest to, the design intent surface. In other examples, for example in instances in which there is relatively minimal or no misalignment, compromise surface model module 28 may be configured to perform best-fit rigid body rotations and translations to reduce the amount of machining required to remove additional material 72 and 74.

In some examples, compromise surface model module 28 may determine the compromise surface model using any suitable numerical analysis. For example, compromise surface model module 28 may utilize a weighted nonlinear least squares minimization to rotate and translate the surface model data to arrive at the compromise surface model. Further, any suitable techniques for solving multidimensional nonlinear problems can be employed; non-limiting examples include Newton-Raphson, sequential over-relaxation, genetic algorithms, gradient methods, among others.

Compromise surface model module 28 may be configured to account for one or more factors when determining the compromise surface model. For example, compromise surface model module 28 may account for component functionality and subsequent manufacturing steps. As other examples, compromise surface model module 28 may be configured to consider retaining the actual shape of dual walled component 62, for example, to avoid extensive re-machining; achieving the original desired shape of dual walled component 62, for example, the design intent definition; achieving functionality requirements, including, but not limited to, smoothness, of the final dual walled component 62; achieving smoothness requirements for subsequent manufacturing processing of dual walled component 62; removing all or substantially all of additional material 72 and 74 from dual walled component 62; and/or removing substantially all additional material 72 and 74 that blocks or occludes a film cooling hole of film cooling holes 70.

As will be appreciated, attempting to meet one factor may increase the extent to which another factor is not met. For example, in some examples, removing substantially all of additional material 72 and 74 may result in greater deviations from the original desired shape of dual walled component. Consequently, compromise surface model module 28 may be configured to determine a compromise surface module based on a weighted analysis of the factors. In some examples, compromise surface model module 28 may be configured to determine the compromise surface model by morphing, or smoothing, the measured surface dimensional data or the surface model data, while meeting specified constraints, or tolerances, on contour and rate of contour deviation.

In some examples, the compromise surface model also may include locations film cooling holes 70, e.g., one or more film cooling holes blocked or occluded by additional material 72 and 74.

Once compromise surface model module 28 has determined the compromise surface model (56), compromise surface model module 28 may communicate the compromise surface model to machining module 26. Machining module 26 may be operable to control machining device 20 to machine dual walled component 62 based on the compromise surface model to remove at least some of the additional material 72 and 74 (58). For example, the compromise surface model may include machine tool program instructions. The machine tool program instructions may include any suitable control instructions for machining device 20, for example, instructions for feed rate, spindle speed, axes motion, or the like.

In some examples, the machine tool program instructions originally include instructions for controlling machining device 20 to mill the design intent surface of dual walled component 62 (e.g., coversheet 68), that is, the originally coded program instructions for coversheet 68, and compromise surface model module 28 or machining module 26 may modify the machine tool program instructions (for example, the G-code) line by line to reshape the design intent surface to the compromise surface model.

Machining dual walled component 62 based on the compromise surface model to remove at least some of the additional material 72 and 74 (58) may include removing additional material 72 from a surface 76 of dual walled component 62, removing additional material 74 from a film cooling hole of film cooling holes 76, or both. Hence, machining dual walled component 62 based on the compromise surface model to remove at least some of the additional material 72 and 74 (58) may utilize one or more machining operations, including milling, drilling, grinding, polishing, or the like.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer system-readable medium, such as a computer system-readable storage medium, containing instructions. Instructions embedded or encoded in a computer system-readable medium, including a computer system-readable storage medium, may cause one or more programmable processors, or other processors, to implement one or more of the techniques described herein, such as when instructions included or encoded in the computer system-readable medium are executed by the one or more processors. Computer system readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer system readable media. In some examples, an article of manufacture may comprise one or more computer system-readable storage media.

Various examples have been described. These and other examples are within the scope of the following claims.

The invention claimed is:

1. A method comprising:
controlling, by a computing device, at least one sensor to inspect at least a portion of a coversheet of a dual walled component to generate dimensional surface data for the at least the portion of the coversheet;
comparing, by the computing device, the dimensional surface data to surface model data, wherein the comparison indicates portions of the coversheet that include additional material, wherein the additional material comprises material from a compliant layer that contacted the coversheet during a process of joining the coversheet of the dual walled component to a spar of the dual walled component;
generating, by the computing device, a compromise surface model based on the comparison between the dimensional surface data and the surface model data; and
controlling, by the computing device, at least one machining device to machine the dual walled component based on the compromise surface model to remove the additional material.

2. The method of claim 1, wherein the at least one sensor comprises a non-contact sensor.

3. The method of claim 1, wherein:
comparing the dimensional surface data to surface model data indicates that additional material is occluding a film cooling hole of the coversheet; and
controlling the at least one machining device to machine the dual walled component based on the compromise surface model to remove the additional material comprises controlling the at least one machining device to machine the film cooling hole to remove additional material from the film cooling hole.

4. The method of claim 1, wherein comparing the dimensional surface data to surface model data utilizes contrast detection to determine the presence of additional material.

5. The method of claim 1, wherein comparing the dimensional surface data to surface model data includes identifying a pattern in deviation of dimensional surface data from the surface model data, wherein the pattern in deviation is the indicative of additional material.

6. A system comprising:
at least one sensor;
at least one machining device; and
a computing device operable to:
control the at least one sensor to inspect at least a portion of a coversheet of a dual walled component to generate dimensional surface data for the at least the portion of the coversheet;
compare the dimensional surface data to surface model data, wherein the comparison indicates portions of the coversheet that include additional material, wherein the additional material comprises material from a compliant layer that contacted the coversheet during a process of joining the coversheet of the dual walled component to a spar of the dual walled component;
generate a compromise surface model based on the comparison between the dimensional surface data and the surface model data; and
control the at least one machining device to machine the dual walled component based on the compromise surface model to remove the additional material.

7. The system of claim 6, wherein the at least one sensor comprises a non-contact sensor.

8. The system of claim 6, wherein:
the comparison of the dimensional surface data to surface model data indicates that additional material is occluding a film cooling hole of the coversheet; and
the computing device is operable to control the at least one machining device to machine the dual walled component based on the compromise surface model to remove the additional material from the film cooling hole.

9. The system of claim 6, wherein the computing device is operable to utilize contrast detection to determine the presence of additional material.

10. The system of claim 6, wherein the computing device is operable to identify a pattern in deviation of dimensional surface data from the surface model data, wherein the pattern in deviation is the indicative of additional material.

11. A computer readable storage medium comprising instructions that, when executed, cause at least one processor to:
control at least one sensor to inspect at least the portion of a coversheet of a dual walled component to generate dimensional surface data for the at least the portion of the coversheet;
compare the dimensional surface data to surface model data, wherein the comparison indicates portions of the coversheet that include additional material, wherein the additional material comprises material from a compliant layer that contacted the coversheet during a process of joining the coversheet of the dual walled component to a spar of the dual walled component;
generate a compromise surface model based on the comparison between the dimensional surface data and the surface model data; and
control at least one machining device to machine the dual walled component based on the compromise surface model to remove the additional material.

12. The computer readable storage medium of claim 11, wherein the at least one sensor comprises a non-contact sensor.

13. The computer readable storage medium of claim 11, wherein:
   comparing the dimensional surface data to surface model data indicates that additional material is occluding a film cooling hole of the coversheet; and
   controlling the at least one machining device to machine the dual walled component based on the compromise surface model to remove the additional material comprises controlling the at least one machining device to machine the film cooling hole to remove additional material from the film cooling hole.

14. The computer readable storage medium of claim 11, wherein comparing the dimensional surface data to surface model data utilizes contrast detection to determine the presence of additional material.

15. The computer readable storage medium of claim 11, wherein comparing the dimensional surface data to surface model data includes identifying a pattern in deviation of dimensional surface data from the surface model data, wherein the pattern in deviation is the indicative of additional material.

\* \* \* \* \*